United States Patent
Chang

(10) Patent No.: US 7,296,362 B2
(45) Date of Patent: Nov. 20, 2007

(54) SURFACE CURVATURE MEASURING APPARATUS FOR OBJECT PROFILES

(76) Inventor: Fu-Kue Chang, No. 43, Jianmin St., Kaohsiung County, Daliao Township (TW)

( * ) Notice: Subject to any disclaimer, the term of this patent is extended or adjusted under 35 U.S.C. 154(b) by 127 days.

(21) Appl. No.: 11/308,139

(22) Filed: Mar. 8, 2006

(65) Prior Publication Data

US 2007/0068023 A1 Mar. 29, 2007

(30) Foreign Application Priority Data

Sep. 23, 2005 (TW) .............................. 94133171 A

(51) Int. Cl.
*G01B 5/20* (2006.01)
(52) U.S. Cl. .......................................... 33/530; 33/553
(58) Field of Classification Search ............. 33/501.02, 33/501.03, 546, 551, 552, 553, 554, 530; 73/104
See application file for complete search history.

(56) References Cited

U.S. PATENT DOCUMENTS

| 2,717,453 | A | * | 9/1955 | Wildt | 33/530 |
| 2,737,726 | A | * | 3/1956 | Christiansen | 33/530 |
| 3,380,170 | A | * | 4/1968 | Read | 33/530 |
| 3,631,603 | A | * | 1/1972 | Munro et al. | 33/553 |
| 4,603,487 | A | * | 8/1986 | Matsunata | 33/551 |
| 6,895,682 | B2 | * | 5/2005 | Sohn et al. | 33/554 |
| 2006/0156566 | A1 | * | 7/2006 | Ingram et al. | 33/554 |

OTHER PUBLICATIONS

Taiwanese Patent Publication No. 543522, Jul. 21, 2003, 7 pages.
Taiwanese Patent Publication No. 312336, Aug. 1, 1997, 5 pages.

* cited by examiner

*Primary Examiner*—G. Bradley Bennett
(74) *Attorney, Agent, or Firm*—Alan Kamrath; Kamrath & Associates PA

(57) ABSTRACT

A surface curvature measuring apparatus includes a platform and a magnetically attractable curvature-measuring module. The platform has a rotary mechanism to mount and to rotate a sample object. The magnetically attractable curvature-measuring module includes a fixed guiding member, a movable measuring member and a magnetically attractable slide track. The movable measuring member includes a magnetic slide to attract the magnetically attractable slide track, and a measuring rod to be in contact with an undersurface of the sample object. The magnetic slide attracts the magnetically attractable slide track but the movable measuring member disposed between the fixed guiding member and the magnetically attractable slide track is capable of moving upwardly or downwardly. When the sample object rotates, a downward stress exerted by the sample object presses on the measuring rod such that the movable measuring member is moved downwardly to appear positions of the undersurface, and subsequently stopped.

19 Claims, 5 Drawing Sheets

SURFACE CURVATURE MEASURING APPARATUS FOR OBJECT PROFILES

BACKGROUND OF THE INVENTION

1. Field of the Invention

The present invention relates to a surface curvature measuring apparatus for object profiles. Particularly, the present invention relates to the surface curvature measuring apparatus having a magnetically attractable curvature-measuring module for measuring the object profiles. More particularly, the present invention also relates to the magnetically attractable curvature measuring module in use for measuring undersurfaces of the object profiles.

2. Description of the Related Art

Conventionally, a surface curvature measuring apparatus, as shown in FIG. 1, is arranged on a platform 1 and includes a bar height adjustment 11, a movable bar 12, a rotary mechanism 13 and a curvature-measuring module 14 which are mounted on the platform 1. The bar height adjustment 11 has a screw connection with the movable bar 12 that can be moved upwardly or downwardly along a vertical direction, and further includes a controllable adjusting wheel 111 to turn a screw rod on which the movable bar 12 is moved and adjusted. The movable bar 12 includes an upper shaft 121 mounted thereto. Correspondingly, the rotary device 13 includes a lower shaft 131 mounted thereto. When assembled, the upper shaft 121 and the lower shaft 131 are substantially in perfect alignment with each other. Mounted between the upper shaft 121 and the lower shaft 131 is a sample object 9 such as a propeller or a vane-like member or the like for measuring curvatures. The curvature-measuring module 14 includes a slide track 141, a slide 142 and a measuring rod 143. Such a measuring technique of the curvature-measuring module 14 has been widely disclosed in many Taiwanese patents, TWN Patent Pub. Nos. 543522 and 312336 for example.

To measure the surface profile, a hub portion of the sample object 9 is clamped between the upper shaft 121 and the lower shaft 131 and rotated about a common axis of the upper shaft 121 and the lower shaft 131. In measuring operation, the slide 142 is movably mounted on the slide track 141 and can be moved upwardly or downwardly thereon in a vertical direction during rotation of the sample object 9. Meanwhile, a top end of the measuring rod 143 connects with the slide 142 while a bottom end of the measuring rod 143 is in contact with a top surface of the sample object 9. The combination of the slide 142 and the measuring rod 143 has an adequate weight to maintain the bottom end of the measuring rod 143 in perfect contact with the top surface of the sample object 9. When the sample object 9 is rotated, the bottom end of the measuring rod 143 can be synchronously moved upwardly or downwardly on the top surface of the object 9.

Vertical positions (i.e. heights) of the slide 142 can be varied by changes in those of the bottom end of the measuring rod 143 which is run along the top surface of the sample object 9. Hence, there is a constant relationship between the vertical positions of the slide 142 and the bottom end of the measuring rod 143. This means that surface curvatures of the top surface of the sample object 9 can be given by the vertical positions of the slide 142. In measuring, data of the vertical positions of the slide 142 are output to a computer device via a transmission line for plotting a profile of the top surface of the sample object 9. Such a top-surface profile of the sample object 9 can be used to analyze hydrodynamics.

Although it would be advantageous to measure the surface curvature of the top surface of the sample object 9, an undersurface thereof cannot be measured at the same time for same selected points of contours. Another problem with the single measurement of the undersurface subsequent to that of the top surface is the further need of turning the sample object 9 over and reassembling it on the apparatus. The primary problem with such a turning procedure may disadvantageously cause a need of realignment among the same selected points of the top surface and the undersurface of the sample object 9. Inevitably, there is a need of repeating the same steps of the previous measuring procedure for the undersurface of the sample object 9 that results in a low efficiency of the entire measurement.

In addition to the above, the bottom end of the measuring rod 143 is exactly in contact with the top surface of the sample object 9, and a downward force resulted from at least weights of the slide 142 and the measuring rod 143 is exerted on the sample object 9. A frictional force between the measuring rod 143 and the sample object 9 may cause a tilt of the measuring rod 143 to its vertical direction. Furthermore, vanes of the sample object 9 are susceptible to distortion due to its thinner thickness if it is made from a thinner material. These must result in errors in the measurement. Hence, there is a need for improving the conventional measuring apparatus and eliminating high-degree errors in the measurement of the surface curvature.

As will be described in greater detail below, the present invention intends to provide a surface curvature measuring apparatus for object profiles. To accomplish an efficient curvature-measuring procedure, the surface curvature measuring apparatus has a magnetically attractable curvature-measuring module for accurately measuring an undersurface of a sample object. To further accomplish a two-side curvature-measuring procedure, the surface curvature measuring apparatus has a gravity curvature-measuring module corresponding to the magnetically attractable curvature-measuring module in such a way as to mitigate and overcome the above problem.

SUMMARY OF THE INVENTION

The primary objective of this invention is to provide a surface curvature measuring apparatus for object profiles, wherein a magnetically attractable curvature-measuring module is used to measure a surface curvature of an undersurface of a sample object in a curvature-measuring procedure. Accordingly, the surface curvature measuring apparatus can accomplish high work efficiency of the curvature-measuring procedure and a high degree of accuracy in the curvature-measuring procedure.

The secondary objective of this invention is to provide the surface curvature measuring apparatus for object profiles, wherein the magnetically attractable curvature-measuring module is in cooperation with a gravity curvature-measuring module. The surface curvature measuring apparatus can carry out a two-side measurement for a top surface and an undersurface of the sample object at the same time in a single curvature-measuring procedure. Accordingly, the surface curvature measuring apparatus can be ease of the curvature-measuring procedure.

Another objective of this invention is to provide the surface curvature measuring apparatus for object profiles, wherein at least one stepping motor set is provided and used to adjust a position of one of the magnetically attractable curvature-measuring module and gravity curvature-measuring module according to selected points of the sample object. Accordingly, the surface curvature measuring apparatus can carry out correct alignment of the measuring modules with the sample object.

Another objective of this invention is to provide the surface curvature measuring apparatus for object profiles, wherein at least one stepping motor set is provided and connected with an a transmission shaft. The transmission shaft steadily drives the sample object to rotate with respect to the magnetically attractable curvature-measuring module. Accordingly, the surface curvature measuring apparatus can carry out a steadily rotational movement of the sample object.

The surface curvature measuring apparatus in accordance with an aspect of the present invention includes a platform and a magnetically attractable curvature-measuring module mounted to the platform. The platform has a rotary mechanism which includes a shaft to mount and to rotate a sample object about it. The magnetically attractable curvature-measuring module includes a fixed guiding member, a movable measuring member and a magnetically attractable slide track. The movable measuring member includes a magnetic slide to attract the magnetically attractable slide track, and a measuring rod to be in contact with an undersurface of the sample object. The movable measuring member is disposed between the fixed guiding member and the magnetically attractable slide track, and the magnetic slide attracts the magnetically attractable slide track but the movable measuring member is capable of moving upwardly or downwardly on the magnetically attractable slide track. In surface curvature measuring, when the sample object rotates, a downward stress exerted by the sample object presses on the measuring rod such that the movable measuring member is moved downwardly and subsequently maintained at a position by an attraction of the magnetic slide to the magnetically attractable slide track.

In a separate aspect of the present invention, the magnetically attractable curvature-measuring module is in cooperation with a gravity curvature-measuring module to carry out a two-side measurement for the sample object in a single curvature-measuring procedure.

In a further separate aspect of the present invention, the surface curvature measuring apparatus includes a first stepping motor set used to adjust positions of the magnetically attractable curvature-measuring module and gravity curvature-measuring module according to selected points of the sample object.

In a yet further separate aspect of the present invention, the surface curvature measuring apparatus includes a second stepping motor set connected with a transmission shaft. The transmission shaft drives the sample object to rotate with respect to the magnetically attractable curvature-measuring module and gravity curvature-measuring module.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
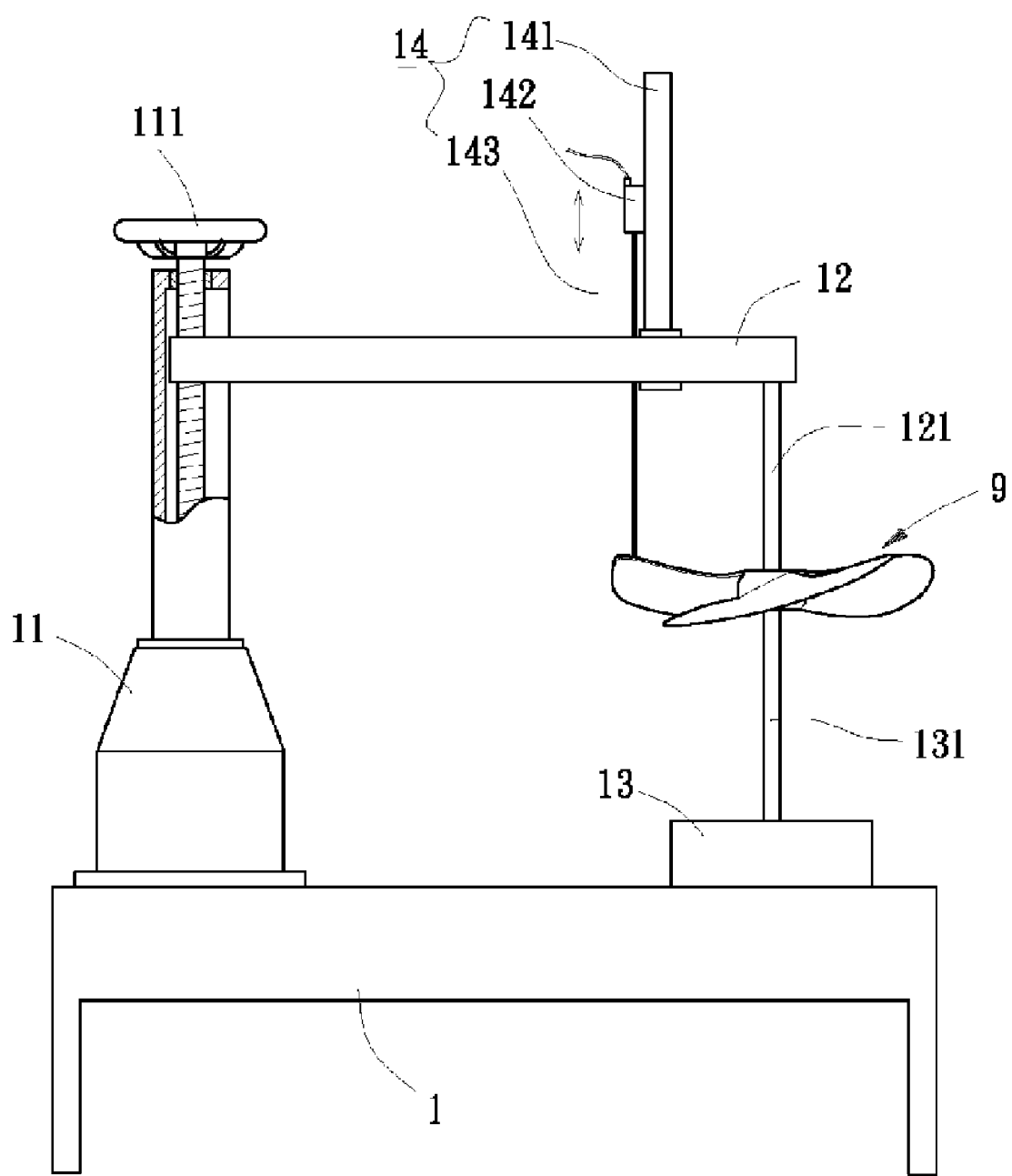
FIG. 1 is a partially cutaway, front elevational view illustrating a surface curvature measuring apparatus in which mounting a sample object in accordance with of the prior art.

Referring to FIGS. 2 through 5, a surface curvature measuring apparatus for object profiles in accordance with the present invention includes a platform designated numeral 1, a lower horizontally position-adjusting device designated numeral 2, a magnetically attractable curvature-measuring module designated numeral 3, an upper horizontally position-adjusting device designated numeral 4 and a gravity curvature-measuring module designated numeral 5.

Figure 2:
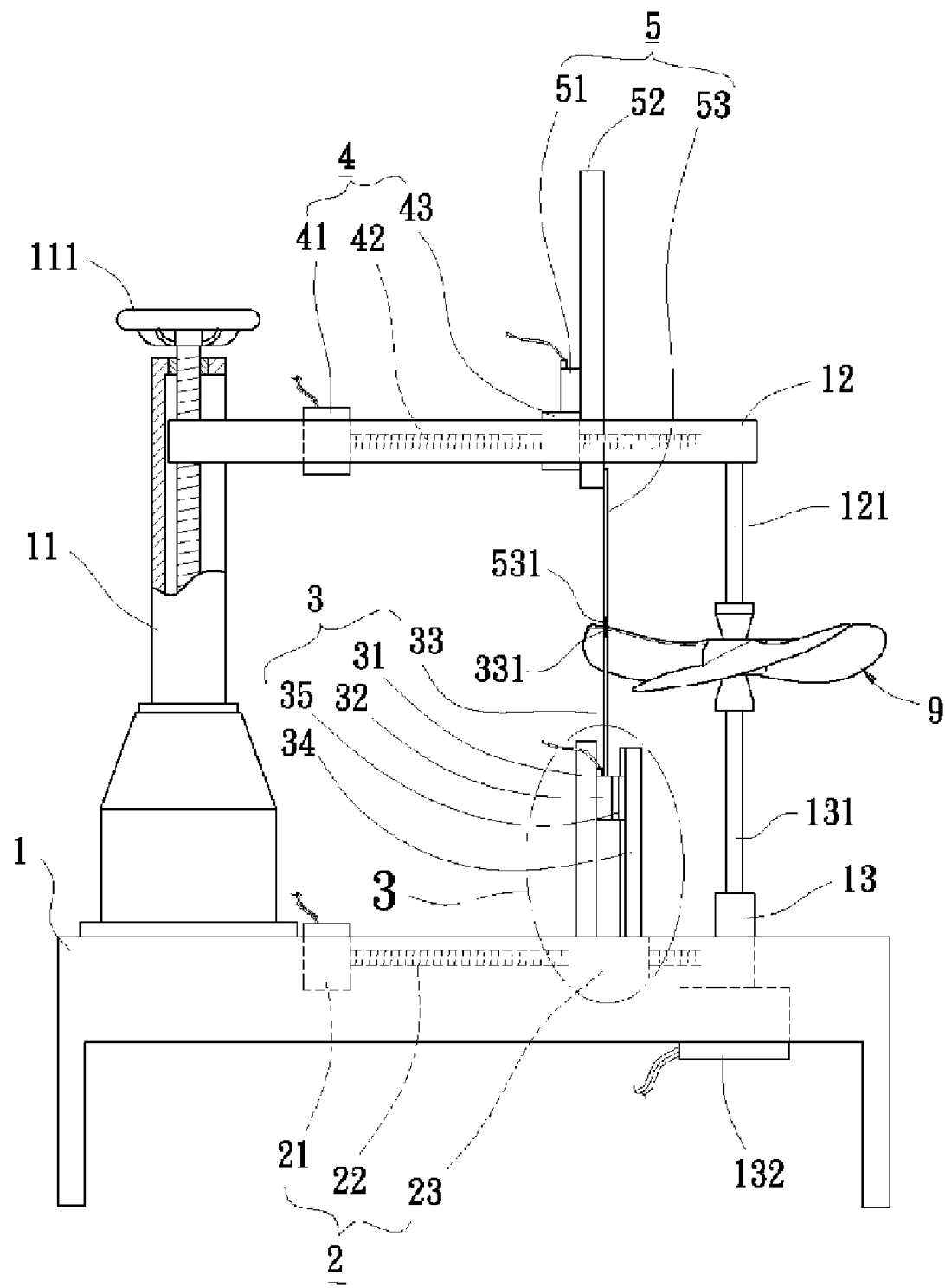
FIG. 2 is a partially cutaway, front elevational view illustrating a surface curvature measuring apparatus for object profiles in accordance with a first embodiment of the present invention.
Figure 3:
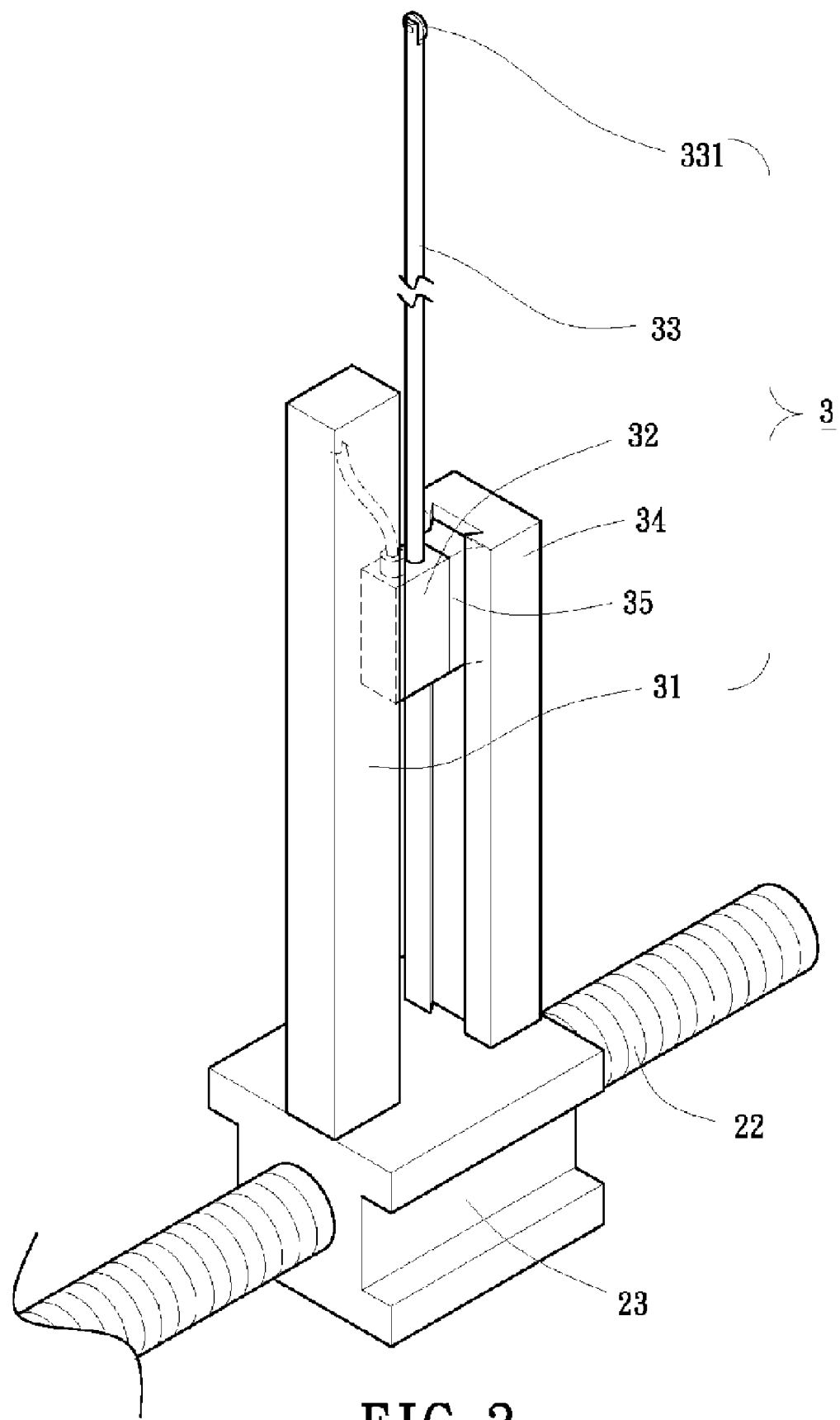
FIG. 3 is an enlarged perspective view illustrating a magnetically attractable curvature-measuring module of the surface curvature measuring apparatus in accordance with the first embodiment of the present invention.

Turning now to FIGS. 2 and 3, partially cutaway, front elevational and enlarged perspective views of the magnetically attractable curvature-measuring module and the surface curvature measuring apparatus in accordance with the first embodiment of the present invention are illustrated. Mounted on the platform 1 are a bar height adjustment 11, a movable bar 12 and a rotary mechanism 13. Preferably, the bar height adjustment 11 is located at a first side of the platform 1. In a preferred embodiment, the bar height adjustment 11 has a screw connection with the movable bar 12 that can be moved upwardly or downwardly along a vertical direction, and further includes a controllable adjusting wheel 111 to turn a screw rod on which the movable bar 12 is moved and adjusted. The movable bar 12 has a first end adjustably mounted on the bar height adjustment 11, and a second end to mount an upper shaft 121. Preferably, the rotary mechanism 13 is located at a second side of the platform 1. In the first embodiment, the rotary mechanism 13 includes a lower shaft 131 corresponding to the upper shaft 121 of the movable bar 12, and a stepping motor 132 for driving and turning the lower shaft 131. When assembled, the upper shaft 121 and the lower shaft 131 are substantially in perfect alignment with each other.

With reference to FIG. 2, each distal end of the upper shaft 121 and the lower shaft 131 has an object mounting member (unlabeled) for mounting a sample object 9 such as a propeller or a vane-like member or the like for measuring curvatures. In an alternative embodiment, the upper shaft 121 and the lower shaft 131 penetrating into a hub portion of the sample object 9 are substantially in contact with each other.

Still referring to FIGS. 2 and 3, in the first embodiment, the lower horizontally position-adjusting device 2 includes a lower stepping motor 21, a lower driving screw rod 22 and a lower slide base 23. The lower stepping motor 21 connects with the lower driving screw rod 22 which penetrates through a screw hole of the lower slide base 23 and has a screw connection therewith. When lower stepping motor 21 drives and rotates the lower driving screw rod 22 which can horizontally move and reciprocate the lower slide base 23 along an axis of the lower driving screw rod 22. Furthermore, in the first embodiment, the upper horizontally position-adjusting device 4 includes an upper stepping motor 41, an upper driving screw rod 42 and an upper slide base 43, each of which is corresponding to that of the lower horizontally position-adjusting device 2. It will be understood that each above component of the upper horizontally position-adjusting device 4 has similar configuration and the same function as that of the lower horizontally position-adjusting device 2 and detailed descriptions may be omitted.

Still referring to FIGS. 2 and 3, the magnetically attractable curvature-measuring module 3 is mounted on the lower slide base 23 of the lower horizontally position-adjusting device 2. In the first embodiment, the magnetically attractable curvature-measuring module 3 includes a fixed guiding member 31, a movable measuring member 32, a lower measuring rod 33 and a magnetically attractable slide track 34. The movable measuring member 32 includes a magnetic slide 35 to attract the magnetically attractable slide track 34, and the lower measuring rod 33 can be in contact with an undersurface of the sample object 9. The movable measuring member 32 is disposed between the fixed guiding member 31 and the magnetically attractable slide track 34. The lower measuring rod 33 is mounted to the movable measuring member 32 to constitute a vertically measuring unit as well as an optical scale. In a preferred embodiment, the movable measuring member 32 includes a displacement-signal generator (not shown) and an output terminal (not shown) for detecting a change in surface curvatures of the undersurface of the sample object 9 and for transmitting measured data to a remote computer device (not shown). It will be understood that the vertically measuring unit can be selected from a rectilinear decoder, an electronic micrometer or other equivalent rectilinearly-movable measuring instruments. In a preferred embodiment, a distal end of the lower measuring rod 33 rotatably mounts a guiding wheel 331 to contact with the undersurface of the sample object 9 such that a frictional force between the distal end of the lower measuring rod 33 and the undersurface of the sample object 9 can be minimized while rotating the sample object 9. The fixed guiding member 31 and the magnetically attractable slide track 34 are mounted on the lower slide base 23 of the lower horizontally position-adjusting device 2, and are parallel each other.

Referring particularly to FIG. 3, the magnetically attractable slide track 34 has an engaging protrusion (unlabeled) to engage with or disengage from an engaging groove of the magnetic slide 35 for assembling or disassembling. In a preferred embodiment, the engaging protrusion and the engaging groove are conjugated, and each of the engaging protrusion and the engaging groove has a dovetailed cross-sectional configuration.

Still referring to FIG. 3, in the first embodiment, one of the magnetically attractable slide track 34 and the magnetic slide 35 is constructed from a magnet to provide an adequate magnetic force therebetween. For instance, the magnetically attractable slide track 34 is made from a magnetic material while the magnetic slide 35 is made from iron or a magnetically conductive material. In an alternative embodiment, conversely, the magnetically attractable slide track 34 is made from iron or a magnetically conductive material while the magnetic slide 35 is made from a magnetic material. In another embodiment, the magnetically attractable slide track 34 and the magnetic slide 35 are constructed from a magnetic north and a magnetic south respectively, or vice versa. In the first embodiment, the magnetic slide 35 attracts the magnetically attractable slide track 34 to provide the adequate magnetic force but it permits moving the movable measuring member 32 upwardly or downwardly on the magnetically attractable slide track 34. This means that a certain extent of a downward stress exerted by the sample object 9 can actuate the movable measuring member 32 and the measuring rod 33 to move a downward distance. However, the magnetic force due to the magnetic slide 35 can maintain positions of the movable measuring member 32 relative to the magnetically attractable slide track 34 if no adequate downward stress from the sample object 9 occurs.

Referring back to FIG. 2, the gravity curvature-measuring module 5 is mounted to the upper slide base 43 of the upper horizontally position-adjusting device 4. In the first embodiment, the gravity curvature-measuring module 5 includes a fixed block 51, a slide track 52 and an upper measuring rod 53. The slide track 52 and the upper measuring rod 53 are movably mounted to the fixed block 51 which is fixed to the upper slide base 43. In a preferred embodiment, the fixed block 51 includes a displacement-signal generator (not shown) and an output terminal (not shown) for detecting a change in surface curvatures of a top surface of the sample object 9 and for transmitting measured data to a remote computer device (not shown). The slide track 52 has an adequate weight such that the upper measuring rod 53 can provide a stress exerting on the top surface of the sample object 9. Meanwhile, the slide track 52 provides an adequate length that permits an operational space of the movement of the upper measuring rod 53 in the vertical direction while measuring the sample object 9. In a preferred embodiment, a distal end of the upper measuring rod 53 rotatably mounts a guiding wheel 531 to contact with the top surface of the sample object 9 such that a frictional force between the distal end of the upper measuring rod 53 and the top surface of the sample object 9 can be minimized while rotating the sample object 9.

Figure 4:
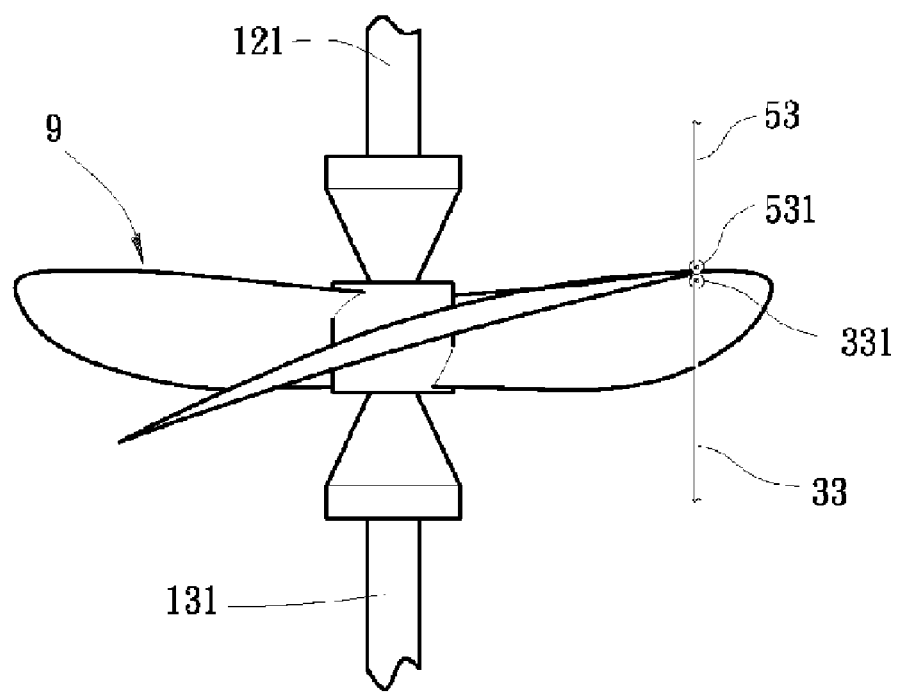
FIG. 4 is an enlarged side elevational view illustrating the surface curvature measuring apparatus in accordance with the first embodiment of the present invention, with an upper measuring rod and a lower measuring rod being in contact with a top surface and an undersurface of the sample object.
Figure 5:
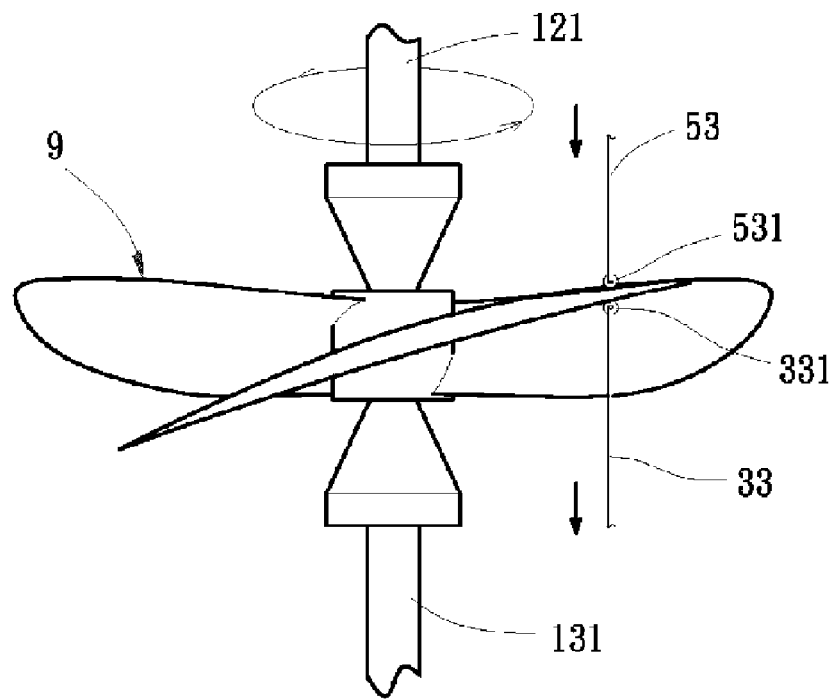
FIG. 5 is an enlarged side elevational view, similar to FIG. 4, illustrating the surface curvature measuring apparatus in accordance with the first embodiment of the present invention, with an upper shaft and a lower shaft rotating the sample object a predetermined angle about a common axis thereof.

Turning now to FIGS. 4 and 5, enlarged side elevational views of the upper measuring rod and the lower measuring rod of the surface curvature measuring apparatus to contact and rotate the sample object are illustrated. With reference to FIGS. 2 through 5, in surface curvature measuring, the guiding wheels 531, 331 of the upper measuring rod 53 and the lower measuring rod 33 are in contact with the top surface and the undersurface of the sample object 9 at the same time. Prior to surface curvature measuring, the lower measuring rod 33 is pulled upwardly until the guiding wheel 331 of the lower measuring rod 33 is in contact with the undersurface of the sample object 9. In a preferred embodiment, the guiding wheel 331 of the lower measuring rod 33 and the undersurface of the sample object 9 can magnetically attract each other. The magnetic force due to the magnetic slide 35 can maintain positions of the movable measuring member 32 relative to the magnetically attractable slide track 34. When the stepping motor 132 drives the sample object 9 for steady rotation, the downward stress exerted by the undersurface of the sample object 9 presses on the lower measuring rod 33 such that the movable measuring member 32 is moved downwardly according to surface curvatures and maintained at a position by an attraction of the magnetic slide 35 to the magnetically attractable slide track 34.

Referring particularly to FIG. 5, once the sample object 9 is rotated a predetermined angular movement; a series of the positions of the movable measuring member 32 will give an object profile of the surface curvature of the sample object 9. On the other hand, the upper measuring rod 53 can be automatically moved in a downward or upward direction by the gravity force of the slide track 52. Thus, a series of positions of the slide track 52 will give an object profile of the surface curvature of the sample object 9. Consequently, a two-side curvature-measuring procedure is accomplished. In measuring operation, unwanted frictional force on the sample object 9 can be minimized by using the guiding wheels 331, 531 such that operational vibrations of the measuring rod 33, 53 can be avoided. In the two-side curvature-measuring procedure the above steps can be repeated at several selected points of the sample object 9.

Referring again to FIGS. 4 and 5, in an alternative embodiment, the magnetic slide 35 is omitted in the magnetically attractable curvature-measuring module 3 so that the movable measuring member 32 can directly attract the magnetically attractable slide track 34 to provide an adequate magnetic force. In another embodiment, the movable measuring member 32 has an engaging portion to engage in the engaging groove of the magnetically attractable slide track 34. In a preferred embodiment, one of the movable measuring member 32 and the magnetically attractable slide track 34 is constructed from a magnet to provide an adequate magnetic force therebetween. For instance, the movable measuring member 32 is made from a magnetic material while the magnetically attractable slide track 34 is made from iron or a magnetically conductive material. In an alternative embodiment, conversely, the magnetically attractable slide track 34 is made from iron or a magnetically conductive material while the movable measuring member 32 is made from a magnetic material. In another embodiment, both of the movable measuring member 32 and the magnetically attractable slide track 34 are constructed from magnets.

Referring again to FIGS. 2 and 5, to measure various selected points on the sample object 9, horizontal positions of the magnetically attractable curvature-measuring module 3 can be adjusted by implementing fine or flat tuning of the lower horizontally position-adjusting device 2. The lower stepping motor 21 and the lower driving screw rod 22 of the lower horizontally position-adjusting device 2 can move the lower slide base 23 on which the magnetically attractable curvature-measuring module 3 is mounted. Consequently, the positions of the magnetically attractable curvature-measuring module 3 with respect to the platform 1 are adjusted in a simplified manner. Similarly, horizontal positions of the gravity curvature-measuring module 5 can be adjusted by implementing fine or flat tuning of the upper horizontally position-adjusting device 4. The upper stepping motor 41 and the upper driving screw rod 42 of the upper horizontally position-adjusting device 4 can move the upper slide base 43 on which the gravity curvature-measuring module 5 is mounted. Consequently, the positions of the gravity curvature-measuring module 5 with respect to the platform 1 are adjusted in a simplified manner.

It will be understood that the guiding wheels 531, 331 of the upper measuring rod 53 and the lower measuring rod 33 are in contact with the same point of the top surface and the undersurface of the sample object 9 if the upper measuring rod 53 and the lower measuring rod 33 are in perfect alignment with each other. Conversely, the two guiding wheels 531, 331 of the upper measuring rod 53 and the lower measuring rod 33 are in contact with two different selected points either on the two-side surfaces of the sample object 9 for measuring surface curvature at the same time. This means that a selected point of the top surface can be different from that of the undersurface of the sample object 9 by adjusting the lower horizontally position-adjusting device 2, the upper horizontally position-adjusting device 4 or both.

By referring back to FIG. 2, vertical positions of the movable bar 12 and the gravity curvature-measuring module 5 can be adjusted by implementing the bar height adjustment 11. Consequently, the upper shaft 121 and the lower shaft 131 can securely mount the sample object 9 if the vertical position of the movable bar 12 is correctly adjusted. Accordingly, the surface curvature measuring apparatus of the present invention can apply to various size of the sample object 9 that enhances measuring operation, workability and accuracy of the adjustment in the surface curvature measuring operation.

Figure 6:
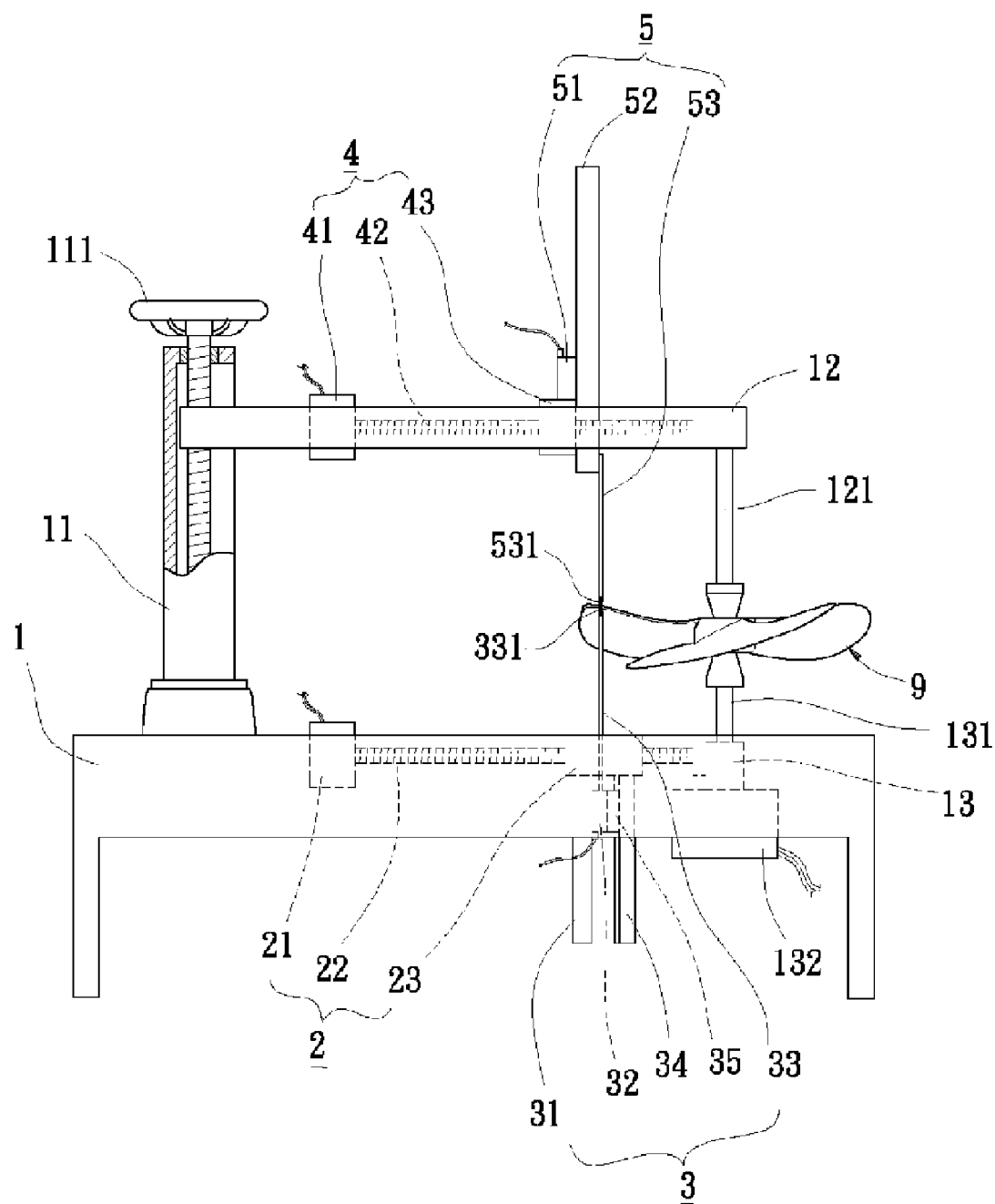
FIG. 6 is a partially cutaway, front elevational view, similar to FIG. 2, illustrating the surface curvature measuring apparatus for object profiles in accordance with a second embodiment of the present invention.

Turning now to FIG. 6, a partially cutaway, front elevational view of the surface curvature measuring apparatus for object profiles in accordance with a second embodiment of the present invention is illustrated. With reference to FIG. 2, the magnetically attractable curvature-measuring module 3 of the first embodiment is mounted on the lower slide base 23 such that a length of the magnetically attractable slide track 34 is confined between the platform 1 and the sample object 9 to form a limited space where the movable measuring member 32 is moved upwardly or downwardly. In comparison with the first embodiment, the magnetically attractable curvature-measuring module 3 of the second embodiment is mounted on a bottom surface of the lower slide base 23 so that the length of the magnetically attractable slide track 34 can be extended below the platform 1. Accordingly, the movable measuring member 32 can be moved upwardly or downwardly along a greater length of the magnetically attractable slide track 34. In assembling operation, the fixed guiding member 31, the movable measuring member 32 and the magnetically attractable slide track 34 of the magnetically attractable curvature-measuring module 3 are mounted on the bottom surface of the lower slide base 23.

It will be apparent from the aforementioned discussions that the conventional surface curvature measuring apparatus can only measure the surface curvature of the top surface of the sample object 9 by simply using the curvature-measuring module 14. In this manner, the two-side surfaces of the sample object 9 cannot be measured at the same time. Referring back to FIG. 2, conversely, the surface curvature measuring apparatus of the present invention employs the magnetically attractable curvature-measuring module 3 and the gravity curvature-measuring module 5 can measure the surface curvatures of the undersurface and the top surface of the sample object 9 at the same time.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A surface curvature measuring apparatus for object profiles, comprising:

a platform having a rotary mechanism, the rotary mechanism including a lower shaft to support and rotate a sample object; and a magnetically attractable curvature-measuring module including a vertically measuring unit and a magnetically attractable slide track, the vertically measuring unit being slidably moved upwardly or downwardly along the magnetically attractable slide track, and being in contact with an undersurface of the sample object;

wherein the rotary mechanism rotates the sample object, a downward stress exerted by the sample object presses on the vertically measuring unit such that the vertically measuring unit is moved downwardly to appear vertical positions of the undersurface of the sample object, and subsequently maintained at a position by an attraction of the vertically measuring unit to the magnetically attractable slide track.

2. The surface curvature measuring apparatus as defined in claim 1, wherein the vertically measuring unit is selected from an optical scale, the vertically measuring unit includes a movable measuring member and a lower measuring rod used to contact with the undersurface of the sample object.

3. The surface curvature measuring apparatus as defined in claim 1, wherein the magnetically attractable curvature-measuring module includes a fixed guiding member, the fixed guiding member and the magnetically attractable slide track are parallel each other such that the vertically measuring unit is disposed between the fixed guiding member and the magnetically attractable slide track.

4. The surface curvature measuring apparatus as defined in claim 1, wherein an engaging protrusion of the vertically measuring unit and an engaging groove of the magnetically attractable slide track are conjugated, each of the engaging protrusion and the engaging groove has a dovetailed cross-sectional configuration.

5. The surface curvature measuring apparatus as defined in claim 1, wherein the vertically measuring unit is made from a magnetic material while the magnetically attractable slide track is made from a magnetically conductive material, or vice versa.

6. The surface curvature measuring apparatus as defined in claim 1, wherein the vertically measuring unit and the magnetically attractable slide track are constructed from a magnetic north and a magnetic south respectively, or vice versa.

7. The surface curvature measuring apparatus as defined in claim 2, wherein a distal end of the lower measuring rod rotatably mounts a guiding wheel to contact with the undersurface of the sample object.

8. The surface curvature measuring apparatus as defined in claim 1, wherein the vertically measuring unit is selected from a rectilinear decoder, an electronic micrometer or other equivalent rectilinearly-movable measuring instruments.

9. The surface curvature measuring apparatus as defined in claim 1, wherein the platform further includes a lower horizontally position-adjusting device, the lower horizontally position-adjusting device includes a lower stepping motor, a lower driving screw rod and a lower slide base for adjusting a position of the magnetically attractable curvature-measuring module.

10. The surface curvature measuring apparatus as defined in claim 9, wherein the magnetically attractable curvature-measuring module is mounted on a top surface or a bottom surface of the lower slide base.

11. The surface curvature measuring apparatus as defined in claim 1, wherein the rotary mechanism further includes a stepping motor to rotate the lower shaft.

12. The surface curvature measuring apparatus as defined in claim 1, further including a bar height adjustment and a movable bar located at a side of the platform, the movable bar has a first end adjustably mounted on the bar height adjustment, and a second end to mount an upper shaft which is in alignment with the lower shaft.

13. The surface curvature measuring apparatus as defined in claim 12, wherein the movable bar mounts a gravity curvature-measuring module, the gravity curvature-measuring module includes a fixed block, a slide track and an upper measuring rod for measuring surface curvatures of a top surface of the sample object.

14. The surface curvature measuring apparatus as defined in claim 13, wherein the bar height adjustment further includes an upper horizontally position-adjusting device, the upper horizontally position-adjusting device includes an upper stepping motor, an upper driving screw rod and an upper slide base for adjusting a position of the gravity curvature-measuring module.

15. The surface curvature measuring apparatus as defined in claim 13, wherein the upper measuring rod of the gravity curvature-measuring module rotatably mounts a guiding wheel to contact with the top surface of the sample object.

16. The surface curvature measuring apparatus as defined in claim 1, wherein the vertically measuring unit further includes a magnetic slide to attract the magnetically attractable slide track.

17. The surface curvature measuring apparatus as defined in claim 16, wherein an engaging protrusion of the magnetic slide and an engaging groove of the magnetically attractable slide track are conjugated, each of the engaging protrusion and the engaging groove has a dovetailed cross-sectional configuration.

18. The surface curvature measuring apparatus as defined in claim 16, wherein the magnetic slide is made from a magnetic material while the magnetically attractable slide track is made from a magnetically conductive material.

19. The surface curvature measuring apparatus as defined in claim 16, wherein the magnetic slide and the magnetically attractable slide track are constructed from a magnetic north and a magnetic south respectively, or vice versa.

* * * * *